US012625385B2

(12) United States Patent
Chao et al.

(10) Patent No.: US 12,625,385 B2
(45) Date of Patent: May 12, 2026

(54) OPTICAL ELEMENT DRIVING MECHANISM

(71) Applicant: Actutek Corporation, Taoyuan City (TW)

(72) Inventors: Chen-Hung Chao, Taoyuan City (TW); Po-Xiang Zhuang, Taoyuan City (TW); Chao-Chang Hu, Taoyuan City (TW); Yi-Ho Chen, Taoyuan City (TW); Shou-Jen Liu, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 354 days.

(21) Appl. No.: 18/351,716

(22) Filed: Jul. 13, 2023

(65) Prior Publication Data

US 2024/0019712 A1     Jan. 18, 2024

Related U.S. Application Data

(60) Provisional application No. 63/388,793, filed on Jul. 13, 2022.

(51) Int. Cl.
| | |
|---|---|
| *G02B 27/01* | (2006.01) |
| *G02B 7/02* | (2021.01) |
| *G03B 5/00* | (2021.01) |
| *G03B 17/12* | (2021.01) |
| *H02K 41/035* | (2006.01) |

(52) U.S. Cl.
CPC ........... *G02B 27/0172* (2013.01); *G02B 7/02* (2013.01); *G02B 27/01* (2013.01); *G02B 27/0176* (2013.01); *G03B 5/00* (2013.01); *G03B 17/12* (2013.01); *H02K 41/0354* (2013.01); *G02B 2027/0159* (2013.01); *G03B 2205/0069* (2013.01)

(58) Field of Classification Search
CPC .............................. G02B 27/646; H04N 23/57
See application file for complete search history.

(56) References Cited

U.S. PATENT DOCUMENTS

| | | | | |
|---|---|---|---|---|
| 2006/0120708 A1* | 6/2006 | Kosaka | ................. | F03G 7/0645 |
| | | | | 348/E5.046 |
| 2021/0173175 A1* | 6/2021 | Itagaki | ................. | G02B 27/646 |
| 2021/0294069 A1* | 9/2021 | Miller | ...................... | G02B 7/09 |
| 2022/0236583 A1* | 7/2022 | Eddington | ........... | G02B 27/646 |

* cited by examiner

*Primary Examiner* — Noam Reisner
(74) *Attorney, Agent, or Firm* — Muncy, Geissler, Olds & Lowe, P.C.

(57) ABSTRACT

An optical element driving mechanism is provided, including a movable part, a fixed part, a driving assembly, and a circuit assembly. The movable part is connected to an optical element. The movable part is movable relative to the fixed part. The driving assembly drives the movable part to move relative to the fixed part. The circuit assembly is electrically connected to the driving assembly.

19 Claims, 9 Drawing Sheets

1

100

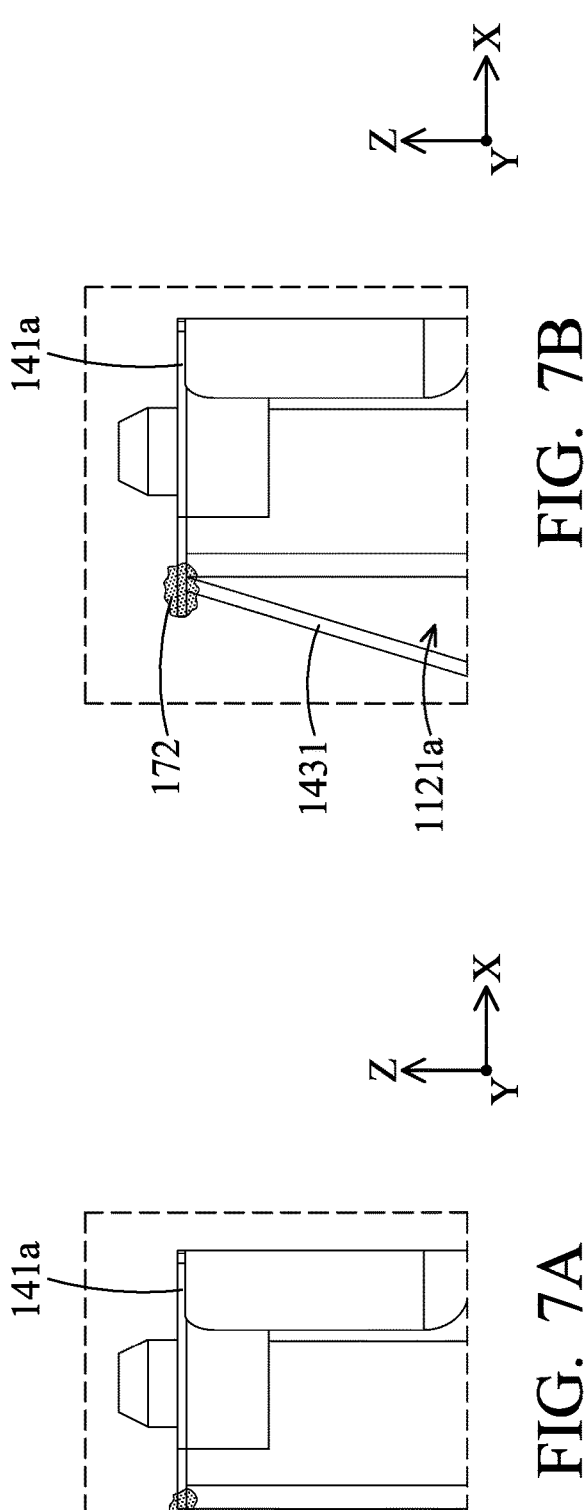
FIG. 7A
FIG. 7B
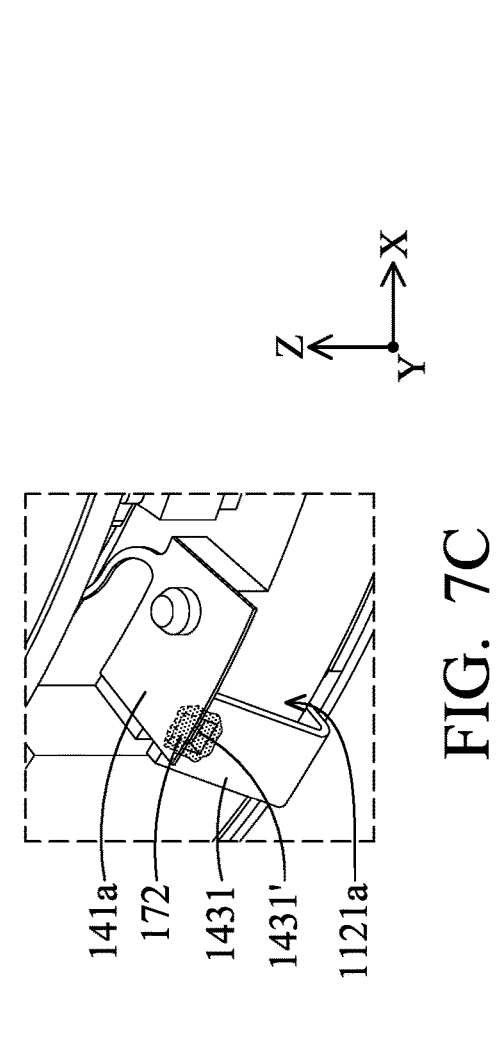
FIG. 7C

OPTICAL ELEMENT DRIVING MECHANISM

CROSS REFERENCE TO RELATED APPLICATIONS

This application claims the benefit of U.S. Provisional Application No. 63/388,793, filed Jul. 13, 2022, the entirety of which is incorporated by reference herein.

BACKGROUND OF THE INVENTION

Field of the Invention

The present disclosure relates to an optical element driving mechanism, and more particularly, the present disclosure relates to an optical element driving mechanism for an electronic device.

Description of the Related Art

As the relevant technologies have been developed, many electronic devices (such as computers and tablets) are equipped with the capability to record images and videos. However, when an optical element (such as lens) having a long focal length is provided in an electronic device, the thickness of the electronic device may be increased, impeding the prospects for miniaturization of the electronic device. Therefore, how to design an optical element driving mechanism and an optical device that may miniaturize the electronic device has become an important issue.

BRIEF SUMMARY OF THE INVENTION

To solve the problems of the prior art, an optical element driving mechanism, including a movable part, a fixed part, a driving assembly, and a circuit assembly. The movable part is connected to an optical element. The movable part is movable relative to the fixed part. The driving assembly drives the movable part to move relative to the fixed part. The circuit assembly is electrically connected to the driving assembly.

In one of the embodiments of the present disclosure, the circuit assembly includes a first circuit element electrically connected to the driving assembly, and the first circuit element includes a first circuit element fixed part fixing end, a first circuit element movable part fixing end, and a first circuit element flexible portion. The first circuit element movable part fixing end is opposite to the first circuit element fixed part fixing end. The first circuit element flexible portion is flexible. The first circuit element movable part fixing end is elastically connected to the first circuit element fixed part fixing end via the first circuit element flexible portion.

In one of the embodiments of the present disclosure, the first circuit element has a plate-like structure. The first circuit element flexible portion has a strip-shaped structure. A minimum width of the first circuit element flexible portion is greater than 0.04 mm. A maximum width of the first circuit element flexible portion is less than 0.5 mm. The first circuit element has a conductive material.

In one of the embodiments of the present disclosure, the first circuit element flexible portion is compressed or extended as the movable part moves relative to the fixed part.

In one of the embodiments of the present disclosure, when viewed along a direction that is perpendicular to an optical axis, the first circuit element fixed part fixing end and the first circuit element movable part fixing end do not overlap each other.

In one of the embodiments of the present disclosure, the circuit assembly further includes a second circuit element. The first circuit element and the second circuit element have different materials. The first circuit element has copper or titanium copper. The second circuit element has stainless steel. The second circuit element is fixedly disposed on the movable part.

In one of the embodiments of the present disclosure, the Young's modulus of the second circuit element is greater than the Young's modulus of the first circuit element.

In one of the embodiments of the present disclosure, the second circuit element has a plate-like structure. The second circuit element has a conductive material. The first circuit element and the second circuit element at least partially overlap when viewed along a thickness direction of the second circuit element. An insulating element is disposed between the first circuit element and the second circuit element. The second circuit element is fixed to the movable part via the insulating element. The insulating element is not in contact with the first circuit element.

In one of the embodiments of the present disclosure, the circuit assembly further includes a third circuit element, and the third circuit element is electrically connected to the driving assembly. The driving assembly is electrically connected to the third circuit element via the first circuit element. The third circuit element includes a third circuit element electrical connective portion, and the third circuit element electrical connective portion has a plate-like structure.

In one of the embodiments of the present disclosure, the fixed part includes a base, and the base includes a base first accommodating portion. The base first accommodating portion corresponds to the third circuit element electrical connective portion. A base first accommodating portion surface of the base first accommodating portion faces toward the third circuit element electrical connective portion. An electrical connective element is disposed between the third circuit element electrical connective portion and the first circuit element fixed part fixing end.

In one of the embodiments of the present disclosure, the first circuit element fixed part fixing end is aligned with the third circuit element electrical connective portion, and the electrical connective element is disposed at the area where the first circuit element fixed part fixing end contacts the third circuit element electrical connective portion.

In one of the embodiments of the present disclosure, the first circuit element fixed part fixing end protrudes from the third circuit element electrical connective portion, and the electrical connective element is disposed at the area where the first circuit element fixed part fixing end contacts the third circuit element electrical connective portion.

In one of the embodiments of the present disclosure, the third circuit element electrical connective portion has a recessed structure, and the electrical connective element is disposed in the recessed structure.

In one of the embodiments of the present disclosure, the optical element driving mechanism further includes a protective element disposed below the third circuit element. The fixed part includes a base, and the base includes a base second accommodating portion. The base second accommodating portion accommodates the third circuit element and the protective element. The third circuit element is disposed between the base and the protective element. The protective element has a metal material. The protective element has a non-magnetic material. In an optical axis direction, the base extends downward beyond the protective element.

In one of the embodiments of the present disclosure, the optical element driving mechanism further includes an electronic component, and the electronic component includes a position sensing element. The position sensing element senses the movement of the movable part relative to the fixed part. The position sensing element is disposed on the third circuit element. The protective element includes a protective element strengthening portion, and the protective element strengthening portion corresponds to the position sensing element. The protective element strengthening portion has a protruding structure. The protective element has a plate-like structure. When viewed along a thickness direction of the protective element, an area of the protective element strengthening portion is larger than an area of the position sensing element.

In one of the embodiments of the present disclosure, the driving assembly includes a first driving coil, and a second driving coil. The first driving coil is disposed on the movable part. The second driving coil is disposed on the movable part. The first circuit element includes a first circuit element first portion, and a first circuit element second portion. The first circuit element first portion is connected to the first driving coil. The first circuit element second portion, connected to the second driving coil. The first driving coil is electrically connected to the second driving coil via the second circuit element.

In one of the embodiments of the present disclosure, the optical element driving mechanism further includes an electronic component, and the electronic component includes an electronic element. The electronic element is disposed on the third circuit element. The electronic element generates an electrical current. The electrical current flows from the electronic element to the third circuit element, the first circuit element first portion, the first driving coil, the second circuit element, the second driving coil, the first circuit element second portion, and the third circuit element.

In one of the embodiments of the present disclosure, the second circuit element and the first circuit element first portion do not overlap each other when viewed along an optical axis direction.

In one of the embodiments of the present disclosure, the second circuit element is disposed between the first circuit element second portion and the movable part.

In one of the embodiments of the present disclosure, when viewed along an optical axis, the movable part, the second circuit element, an insulating element, and the first circuit element second portion at least partially overlap.

BRIEF DESCRIPTION OF THE DRAWINGS

The present invention may be more fully understood by reading the subsequent detailed description and examples with references made to the accompanying drawings, wherein:

FIG. 7A is a schematic view of the first circuit element fixed part fixing end and the third circuit element electrical connective portion according to some embodiments of the present disclosure.

FIG. 7B is a schematic view of the first circuit element fixed part fixing end and the third circuit element electrical connective portion according to some embodiments of the present disclosure.

FIG. 7C is a schematic view of the first circuit element fixed part fixing end and the third circuit element electrical connective portion according to some embodiments of the present disclosure.

DETAILED DESCRIPTION OF THE INVENTION

The making and using of optical element driving mechanisms of embodiments of the present disclosure are discussed in detail below. It should be appreciated, however, that the embodiments provide many applicable inventive concepts that may be embodied in a wide variety of specific contexts. The specific embodiments discussed are merely illustrative of specific ways to make and use the embodiments and do not limit the scope of the disclosure.

It should be understood that, although the terms "first", "second" etc. may be used herein to describe various elements, layers and/or portions, and these elements, layers, and/or portions should not be limited by these terms. These terms are only used to distinguish one element, layer, or portion. Thus, a first element, layer or portion discussed below could be termed a second element, layer or portion without departing from the teachings of some embodiments of the present disclosure. In addition, for the sake of brevity, terms such as "first" and "second" may not be used in the description to distinguish different elements. As long as it does not depart from the scope defined by the appended claims, the first element and/or the second element described in the appended claims can be interpreted as any element that meets the description in the specification.

It should be noted that the technical solutions provided by different embodiments below may be interchangeable, combined or mixed to form another embodiment without departing from the spirit of the present disclosure.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

The scale of the drawings in the present disclosure may be drawn according to the actual size. The scale of the same figure in the present disclosure can be used as the actual manufacturing scale of the devices, equipment, elements, etc. of the present disclosure. It should be noted that each figure may be drawn at different orientations, which may result in different size ratios among different figures. However, the size ratio shown in an individual figure is not affect by the different size ratios between different figures. People with ordinary skill in the art can understand that the size ratio of the figures in the present disclosure can be used as a distinguishing feature from the prior art.

Figure 1:
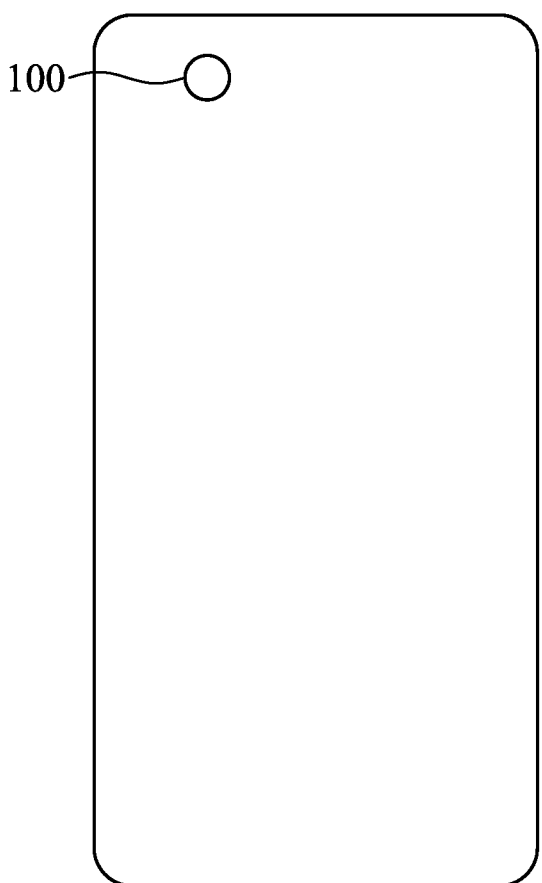
FIG. 1 is a schematic view of an electrical device according to some embodiment of the present disclosure.

Firstly, please refer to FIG. 1, FIG. 1 is a schematic view of an electrical device 1 according to some embodiment of the present disclosure. As shown in FIG. 1, an optical element driving mechanism 100 of some embodiment of the present disclosure may be mounted in an electrical device 1 for taking photos or videos, wherein the aforementioned electrical device 1 may, for example, be a smartphone or a digital camera, but the present disclosure is not limited to these. It should be noted that the position and the size between the optical element driving mechanism 100 and the electrical device 1 shown in FIG. 1 are only an example, which is not for limiting the position and the size between the optical element driving mechanism 100 and the electrical device 1. In fact, according to different needs, the optical element driving mechanism 100 may be mounted at different positions in the electrical device 1.

Figure 2:
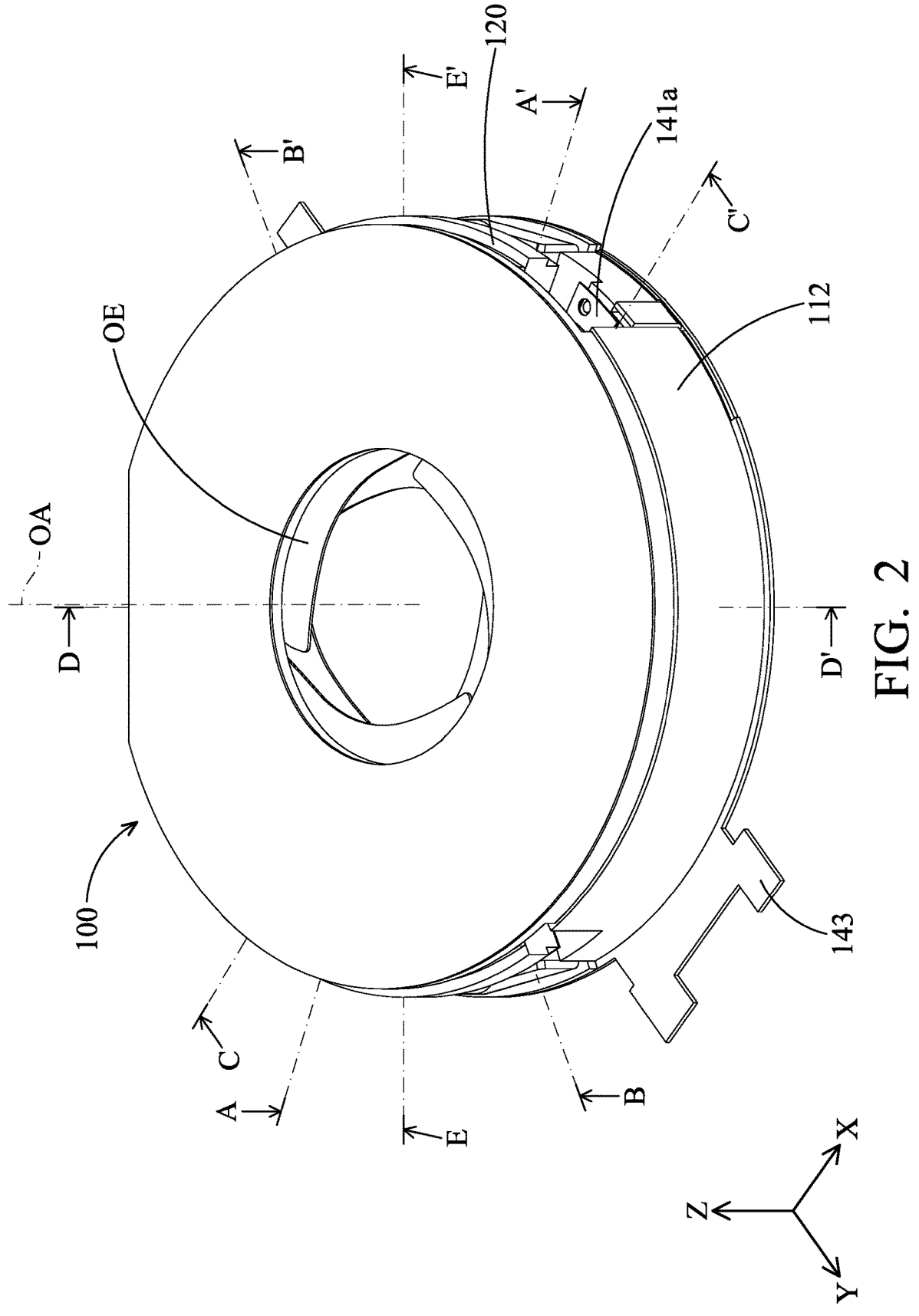
FIG. 2 is a schematic view of an optical element driving mechanism and an optical element according to some embodiments of the present disclosure.
Figure 3:
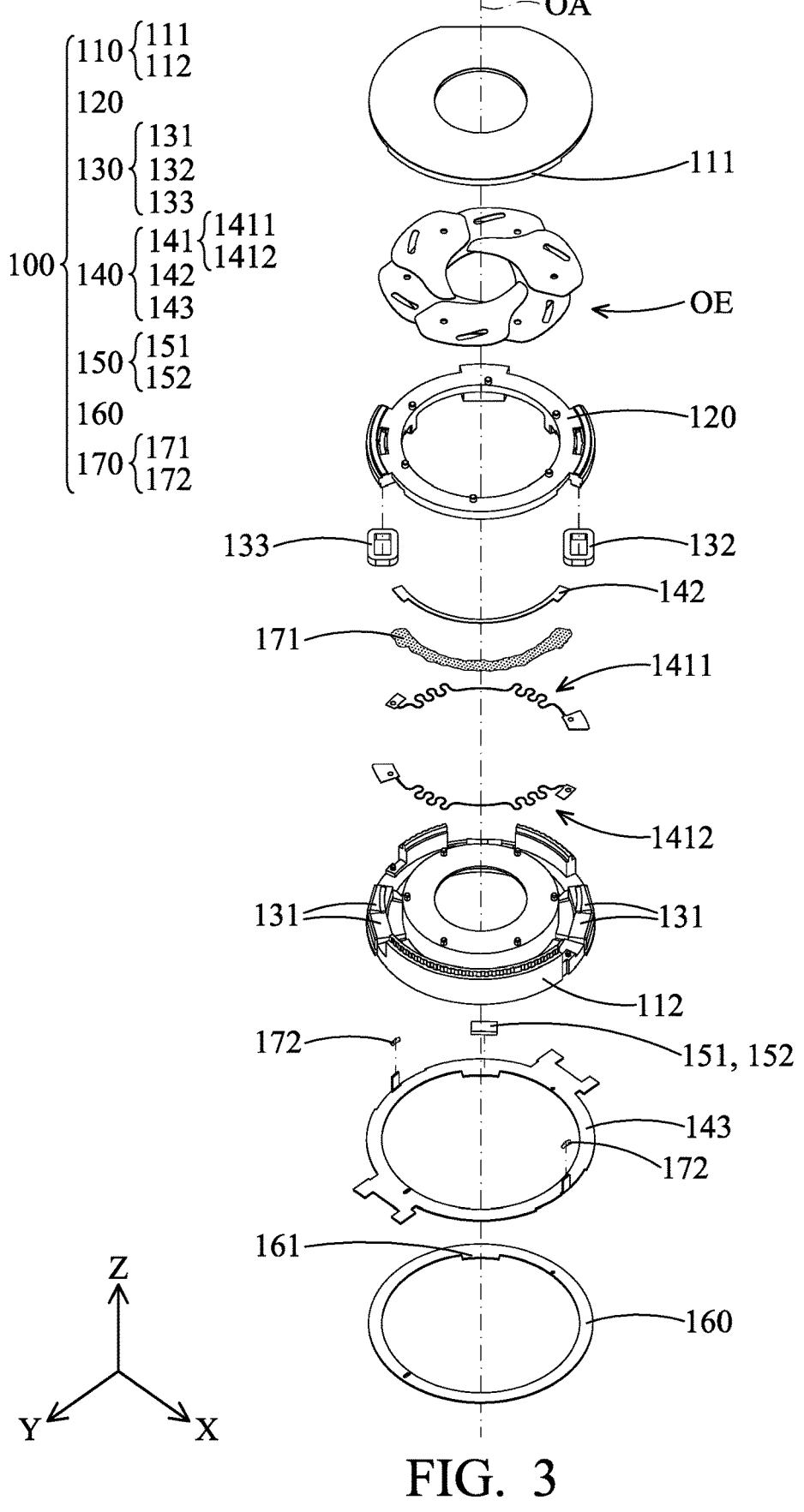
FIG. 3 is an exploded view of the optical element driving mechanism and the optical element according to some embodiments of the present disclosure.

Please refer to FIG. 2 and FIG. 3. FIG. 2 is a schematic view of an optical element driving mechanism 100 and an optical element OE according to some embodiments of the present disclosure. FIG. 3 is an exploded view of the optical element driving mechanism 100 and the optical element OE according to some embodiments of the present disclosure.

The optical element driving mechanism 100 may include a fixed part 110, a movable part 120, a driving assembly 130, a circuit assembly 140, an electronic assembly 150, a protective element 160, and a connective assembly 170.

The fixed part 110 may include an outer frame 111 and a base 112. The outer frame 111 and the base 112 may be connected to each other and form an inner space for accommodating other elements of the optical element driving mechanism 100 or the optical element OE.

The movable part 120 may be connected to the optical element OE, and the movable part 120 may move relative to the fixed part 110. For example, the movable part 120 may move around an optical axis OA relative to the fixed part 110, and the optical element OE may move around the optical axis OA along with the movable part 120 relative to the fixed part 110.

The driving assembly 130 may drive the movable part 120 to move relative to the fixed part 110. The driving assembly 130 may include a driving magnet 131, a first driving coil 132, and a second driving coil 133.

According to some embodiments of the present disclosure, the driving magnet 131 may be disposed on the base 112 of the fixed part 110, and the first driving coil 132 and the second driving coil 133 may be disposed on the movable part 120 to drive the movable part 120 to move relative to the fixed part 110.

The circuit assembly 140 may be electrically connected to the driving assembly 130. According to some embodiments of the present disclosure, the circuit assembly 140 may be electrically connected to the first driving coil 132 and the second driving coil 133 of the driving assembly 130.

The electrical connection relationship between the circuit assembly 140 and the first driving coil 132 and the second driving coil 133 of the driving assembly 130 will be described in more detail below.

As shown in FIG. 3, the circuit assembly 140 may include a first circuit element 141, a second circuit element 142, and a third circuit element 143.

Moreover, the first circuit element 141 may include a first circuit element first portion 1411 and a first circuit element second portion 1412.

The electronic assembly 150 may include an electronic element 151 and a position sensing element 152.

The protective element 160 may have a plate-like structure and a substantially ring-shaped structure.

The connective assembly 170 may have a plate-like structure and a substantially ring-shaped structure. Moreover, the connective assembly 170 may include an insulating element 171 and an electrical connective element 172.

Figure 4:
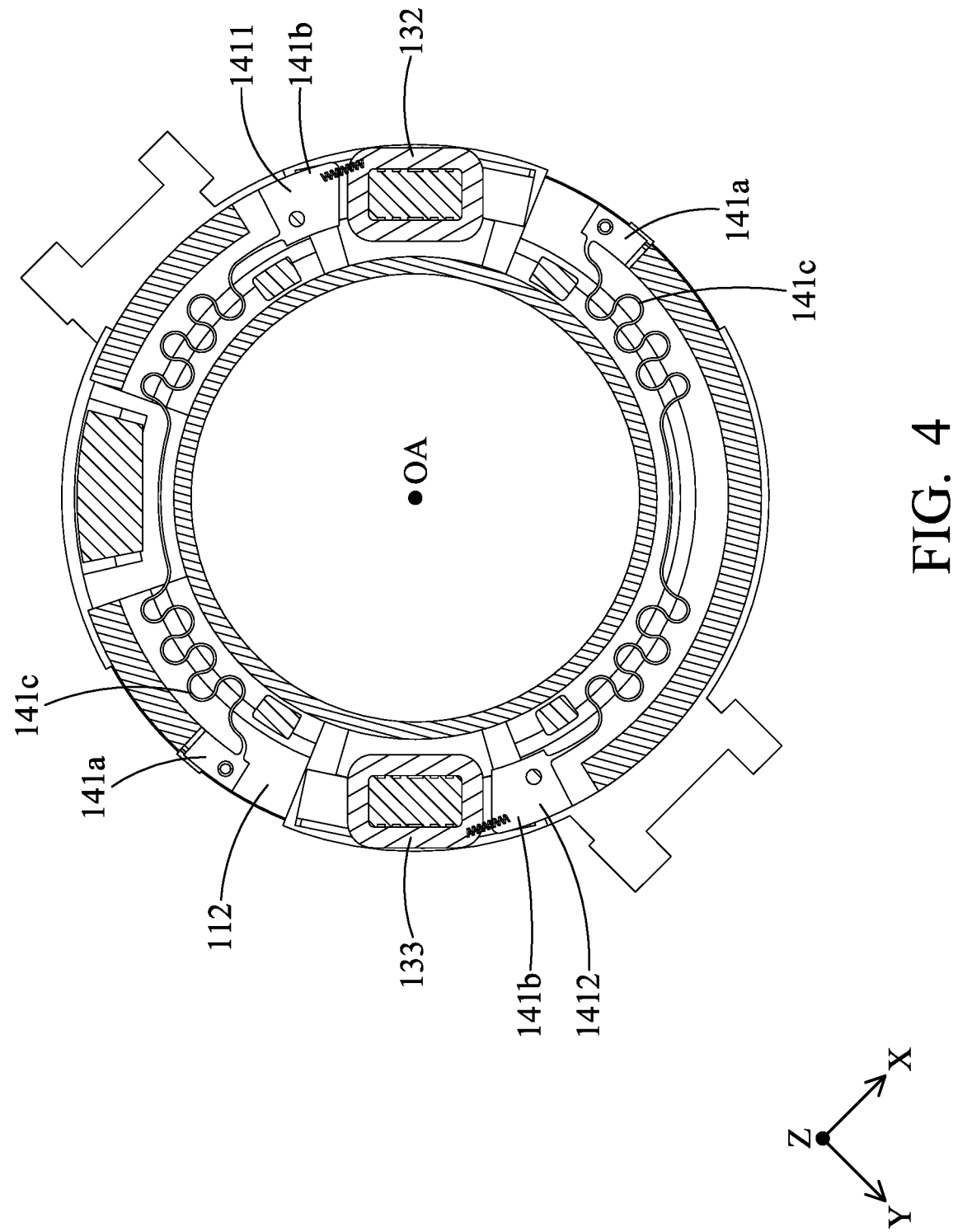
FIG. 4 is a cross-sectional view of the optical element driving mechanism and the optical element along line A-A' in FIG. 2, according to some embodiments of the present disclosure.

Please refer to FIG. 4, FIG. 4 is a cross-sectional view of the optical element driving mechanism 100 and the optical element OE along line A-A' in FIG. 2, according to some embodiments of the present disclosure.

As shown in FIG. 4, the first circuit element 141 may have a plate-like structure, and the first circuit element 141 may be electrically connected to the first driving coil 132 and the second driving coil 133 of the driving assembly 130.

For example, the first circuit element 141 may be directly electrically connected to the first driving coil 132 and the second driving coil 133 of the driving assembly 130; or, the first circuit element 141 may be electrically connected to the first driving coil 132 and the second driving coil 133 of the driving assembly 130 through an additional electrical conductive wire or electrical conductive structure.

As shown in FIG. 4, the first circuit element 141 may include a first circuit element fixed part fixing end 141a, a first circuit element movable part fixing end 141b, and a first circuit element flexible portion 141c.

As shown in FIG. 4, the first circuit element movable part fixing end 141b may be opposite to the first circuit element fixed part fixing end 141a. The first circuit element flexible portion 141c may be flexible. Moreover, the first circuit element movable part fixing end 141b may be elastically connected to the first circuit element fixed part fixing end 141a via the first circuit element flexible portion 141c.

For example, the first circuit element fixed part fixing end 141a and the first circuit element movable part fixing end 141b may be the two ends of the first circuit element 141 respectively, and the first circuit element flexible portion 141c may be the middle part of the first circuit element 141.

Please continue to refer to FIG. 4, according to some embodiments of the present disclosure, the first circuit element flexible portion 141c may have a strip-shaped structure, an arc-shaped structure, or a meandering structure. A minimum width of the first circuit element flexible portion 141c may be greater than 0.04 mm, and a maximum width of the first circuit element flexible portion 141c may be less than 0.5 mm.

According to some embodiments of the present disclosure, the first circuit element flexible portion 141c may be compressed or extended as the movable part 120 moves relative to the fixed part 110.

According to some embodiments of the present disclosure, the Young's modulus of the second circuit element 142 may be greater than the Young's modulus of the first circuit element 141. That is, compared with the second circuit element 142, the first circuit element 141 is relatively "soft".

According to some embodiments of the present disclosure, the first circuit element 141 and the second circuit element 142 may conduct electricity. That is, the first circuit element 141 may not have an insulating material, and the second circuit element 142 may not have an insulating material. For example, the first circuit element 141 may have a conductive material, and the second circuit element 142 may have a conductive material.

However, the first circuit element 141 and the second circuit element 142 may have different materials. For example, the first circuit element 141 may be made of copper or titanium copper. For example, the second circuit element 142 may be made of stainless steel.

In this way, the first circuit element 141 may be easily deformed, and the driving assembly 130 may drive the movable part 120 to move relative to the fixed part 110 with a smaller driving force.

According to some embodiments of the present disclosure, the first circuit element movable part fixing end 141*b* may be fixed to the movable part 120 (FIG. 5), and the first circuit element fixed part fixing end 141*a* may be fixed to the base 112 of the fixed part 110 (FIG. 4).

Therefore, when viewed along a direction that is perpendicular to the optical axis OA, the first circuit element fixed part fixing end 141*a* and the first circuit element movable part fixing end 141*b* may not be located on the same horizontal plane.

That is, when viewed along a direction that is perpendicular to the optical axis OA, the first circuit element fixed part fixing end 141*a* and the first circuit element movable part fixing end 141*b* may not overlap each other.

In this way, the movable part 120 may be driven abutting the fixed part 110, so that the optical element driving mechanism 100 is more stable.

As shown in FIG. 4, the first circuit element first portion 1411 of the first circuit element 141 may be connected to the first driving coil 132.

For example, the first circuit element first portion 1411 may be directly electrically connected to the first driving coil 132; or, the first circuit element first portion 1411 may be electrically connected to the first driving coil 132 through an additional electrical conductive wire or electrical conductive structure.

Also, the first circuit element second portion 1412 of the first circuit element 141 may be connected to the second driving coil 133.

For example, the first circuit element second portion 1412 may be directly electrically connected to the second driving coil 133; or, the first circuit element second portion 1412 may be electrically connected to the second driving coil 133 through an additional electrical conductive wire or electrical conductive structure.

Figure 5:
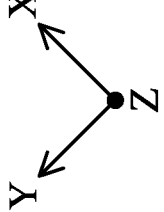
FIG. 5 is a horizontal cross-sectional view of the optical element driving mechanism and the optical element along line B-B' in FIG. 2, according to some embodiments of the present disclosure.

Please refer to FIG. 5, FIG. 5 is a horizontal cross-sectional view of the optical element driving mechanism 100 and the optical element OE along line B-B' in FIG. 2, according to some embodiments of the present disclosure.

As shown in FIG. 5, according to some embodiments of the present disclosure, the second circuit element 142 may have a plate-like structure, and the second circuit element 142 may be fixedly disposed on the movable part 120.

According to some embodiments of the present disclosure, when viewed along a thickness direction of the second circuit element 142 (for example, it may be parallel to the optical axis OA or the Z axis), the first circuit element 141 and the second circuit element 142 may be at least partially overlap.

In this way, the internal space of the optical element driving mechanism 100 may be saved, thereby achieving the effect of miniaturization.

Please continue to refer to FIG. 5, an insulating element 171 may be disposed between the first circuit element 141 and the second circuit element 142, and the second circuit element 142 may be fixed to the movable part 120 via the insulating element 171.

It should be noted that, according to some embodiments of the present disclosure, the insulating element 171 may not be in contact with the first circuit element 141.

In this way, the first circuit element 141 may be more easily compressed or extended as the movable part 120 moves relative to the fixed part 110.

According to some embodiments of the present disclosure, the insulating element 171 may be electrically insulated to avoid direct electrical connection between the first circuit element 141 and the second circuit element 142. For example, the insulating element 171 may be an insulating glue.

According to some embodiments of the present disclosure, the second circuit element 142 may be disposed between the first circuit element second portion 1412 and the movable part 120. Moreover, an insulating element 171 may be disposed between the first circuit element second portion 1412 and the second circuit element 142.

According to some embodiments of the present disclosure, the insulating element 171 may not be in contact with the first circuit element second portion 1412, so as to avoid negative impact on the compression or extension of the first circuit element second portion 1412.

Please continue to refer to FIG. 5, when viewed along the direction of the optical axis OA, the movable part 120, the second circuit element 142, the insulating element 171, and the first circuit element second portion 1412 may at least partially overlap.

According to some embodiments of the present disclosure, when viewed along the direction of the optical axis OA, the second circuit element 142 and the first circuit element first portion 1411 may not overlap each other.

According to some embodiments of the present disclosure, the first driving coil 132 may be electrically connected to the second driving coil 133 via the second circuit element 142.

For example, the second circuit element 142 may be directly electrically connected to the first driving coil 132 and the second driving coil 133 of the driving assembly 130; or, the second circuit element 142 may be electrically connected to the first driving coil 132 and the second driving coil 133 of the driving assembly 130 through an additional electrical conductive wire or electrical conductive structure.

Please refer to the direction of the black arrows in FIG. 5, according to some embodiments of the present disclosure, the flow sequence of the electrical current may be the first circuit element first portion 1411, the first driving coil 132, the second circuit element 142, the second driving coil 133, and the first circuit element second portion 1412.

In this way, a stable current may be established, and the number of elements of the optical element driving mechanism 100 may be simplified, thereby achieving the effects of miniaturization and weight reduction.

Figure 6:
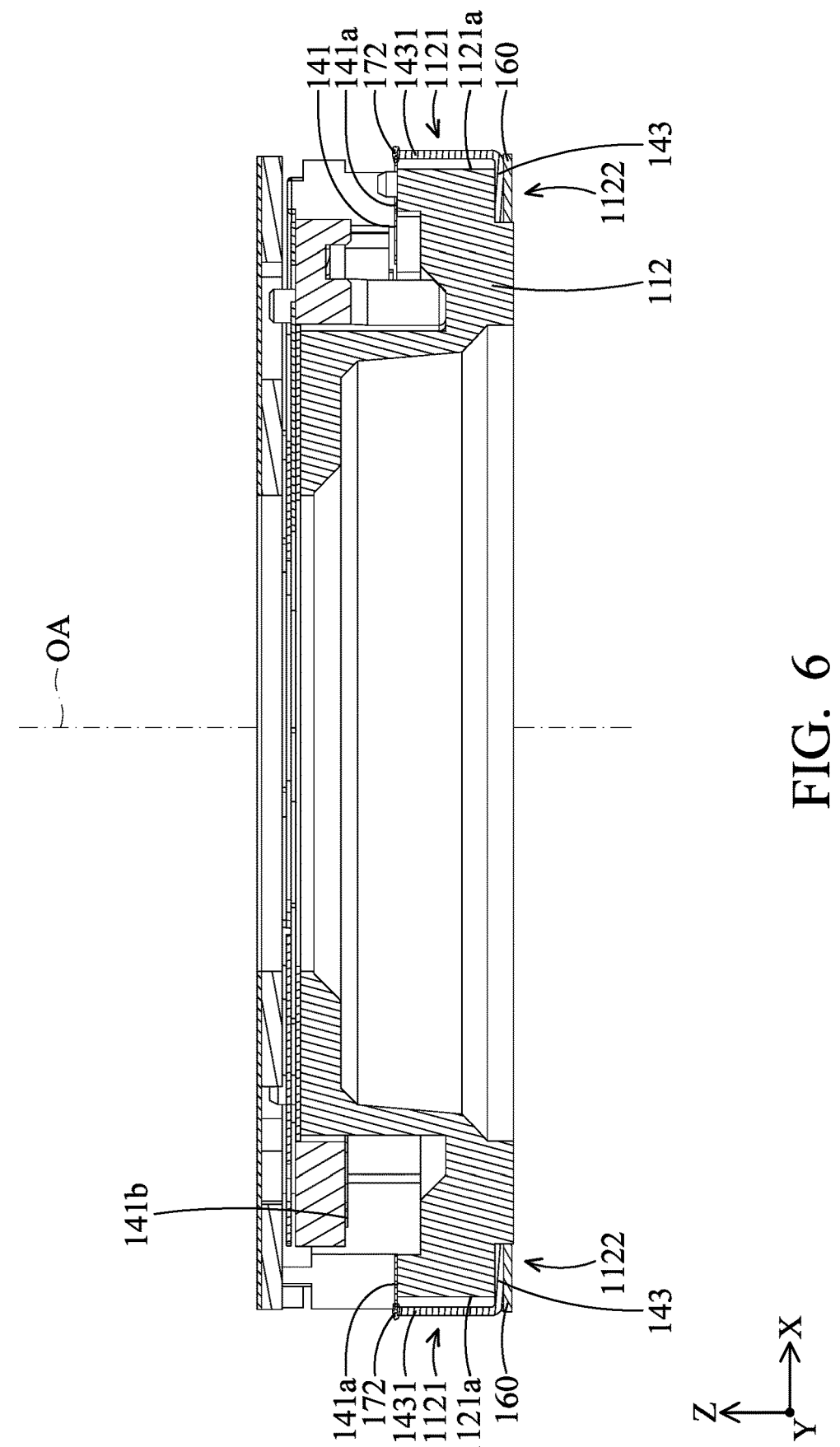
FIG. 6 is a cross-sectional view of the optical element driving mechanism and the optical element along line C-C' in FIG. 2, according to some embodiments of the present disclosure.

Please refer to FIG. 6, FIG. 6 is a cross-sectional view of the optical element driving mechanism 100 and the optical element OE along line C-C' in FIG. 2, according to some embodiments of the present disclosure.

As shown in FIG. 6, the third circuit element 143 may be a flexible printed circuit board, and the third circuit element 143 may include a third circuit element electrical connective portion 1431, and the third circuit element electrical connective portion 1431 may have a plate-like structure.

According to some embodiments of the present disclosure, the third circuit element electrical connective portion 1431 may extend toward the first circuit element 141. For example, the third circuit element electrical connective portion 1431 may extend toward the first circuit element 141 along a direction that is substantially parallel to the optical axis OA.

Please continue to refer to FIG. 6, the base 112 may include a base first accommodating portion 1121, and the base first accommodating portion 1121 corresponds to the third circuit element electrical connective portion 1431. According to some embodiments of the present disclosure, the base first accommodating portion 1121 may be a recess that faces the optical axis OA. Therefore, the base first accommodating portion 1121 may accommodate the third circuit element electrical connective portion 1431.

The base first accommodating portion 1121 may include a base first accommodating portion surface 1121a. The base first accommodating portion surface 1121a may face the third circuit element electrical connective portion 1431. According to some embodiments of the present disclosure, the base first accommodating portion surface 1121a may be parallel to the optical axis OA.

According to some embodiments of the present disclosure, the third circuit element electrical connective portion 1431 may not be parallel to the optical axis OA (please refer to FIG. 7A, FIG. 7B, and FIG. 7C). For example, the third circuit element electrical connective portion 1431 may be inclined toward the optical axis OA (please refer to FIG. 7A, FIG. 7B, and FIG. 7C).

Therefore, the base first accommodating portion surface 1121a and the third circuit element electrical connective portion 1431 may not be parallel to each other (please refer to FIG. 7A, FIG. 7B, and FIG. 7C).

In this way, the connection between the third circuit element electrical connective portion 1431 and the first circuit element 141 may be facilitated, thereby simplifying the manufacture of the optical element driving mechanism 100.

As shown in FIG. 6, the third circuit element electrical connective portion 1431 and the first circuit element 141 may not be parallel to each other, and the electrical connective element 172 may be provided between the third circuit element electrical connective portion 1431 and the first circuit element fixed part fixing end 141a.

According to some embodiments of the present disclosure, the electrical connective element 172 may have a conductive material. For example, the electrical connective element 172 may be solder.

Therefore, the third circuit element 143 may be electrically connected to the first circuit element 141, and the third circuit element 143 may be electrically connected to the driving assembly 130 via the first circuit element 141.

Please refer to FIG. 7A. FIG. 7A is a schematic view of the first circuit element fixed part fixing end 141a and the third circuit element electrical connective portion 1431 according to some embodiments of the present disclosure.

In the embodiment shown in FIG. 7A, the first circuit element fixed part fixing end 141a is aligned with the third circuit element electrical connective portion 1431. In detail, the end point of the first circuit element fixed part fixing end 141a and the end point of the third circuit element electrical connective portion 1431 may be adjacent to each other or are in contact with each other.

In addition, the electrical connective element 172 may be provided at the area where the first circuit element fixed part fixing end 141a contacts the third circuit element electrical connective portion 1431 to electrically connect the third circuit element 143 to the first circuit element 141.

In this way, the electrical connective element 172 may be conveniently disposed to simplify the manufacture of the optical element driving mechanism 100.

Please refer to FIG. 7B. FIG. 7B is a schematic view of the first circuit element fixed part fixing end 141a and the third circuit element electrical connective portion 1431 according to some embodiments of the present disclosure.

In the embodiment shown in FIG. 7B, the first circuit element fixed part fixing end 141a may protrude from the third circuit element electrical connective portion 1431. In detail, the end point of the first circuit element fixed part fixing end 141a may extend beyond the end point of the third circuit element electrical connective portion 1431, so that the end point of the first circuit element fixed part fixing end 141a and the end point of the third circuit element electrical connective portion 1431 may not be adjacent to each other or may be separated by a certain distance.

In addition, an electrical connective element 172 may be disposed at the area where the first circuit element fixed part fixing end 141a contacts the third circuit element electrical connective portion 1431 to electrically connect the third circuit element 143 to the first circuit element 141.

In this way, the electrical connective element 172 may be conveniently disposed to simplify the manufacture of the optical element driving mechanism 100.

Please refer to FIG. 7C. FIG. 7C is a schematic view of the first circuit element fixed part fixing end 141a and the third circuit element electrical connective portion 1431 according to some embodiments of the present disclosure.

In the embodiment shown in FIG. 7C, the third circuit element electrical connective portion 1431 may include a recess structure 1431'.

The first circuit element fixed part fixing end 141a may protrude from the third circuit element electrical connective portion 1431. In detail, the end point of the first circuit element fixed part fixing end 141a may extend beyond the end point of the third circuit element electrical connective portion 1431 and the recessed structure 1431', so that the end point of the first circuit element fixed part fixing end 141a and the end point of the third circuit element electrical connective portion 1431 may not be adjacent to each other or may be separated by a certain distance.

In addition, the electrical connective element 172 may be disposed at the area where the first circuit element fixed part fixing end 141a contacts the third circuit element electrical connective portion 1431 to electrically connect the third circuit element 143 to the first circuit element 141.

It should be noted that an electrical connective element 172 may also be disposed in the recessed structure 1431' to prevent the electrical connective element 172 from flowing to an unwanted position, and the recessed structure 1431' may increase the contacting area between the third circuit element electrical connective portion 1431 and the electrical connective element 172, thus the optical element driving mechanism 100 may be more stable.

Figure 8:
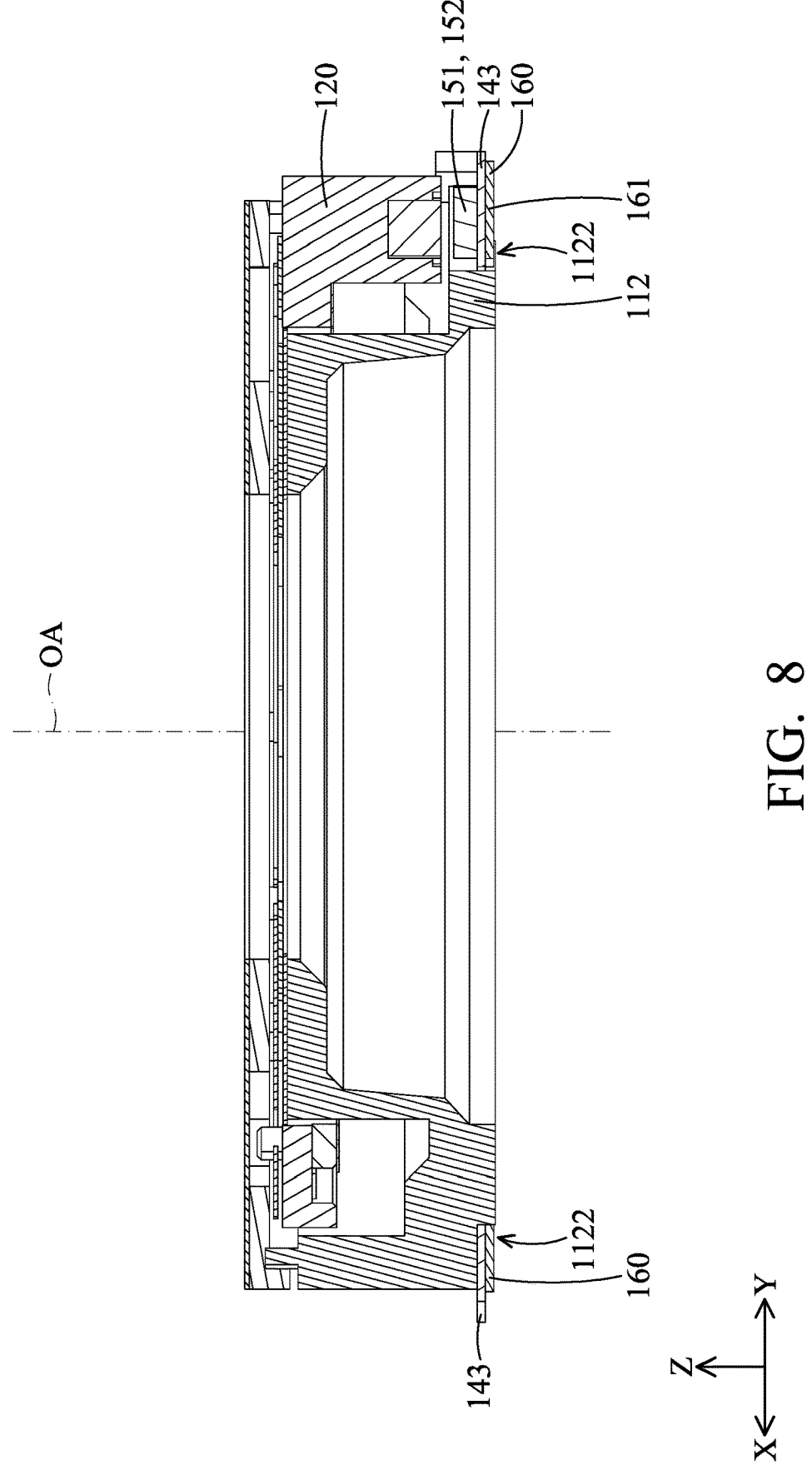
FIG. 8 is a cross-sectional view of the optical element driving mechanism and the optical element along line D-D' in FIG. 2, according to some embodiments of the present disclosure.
Figure 9:
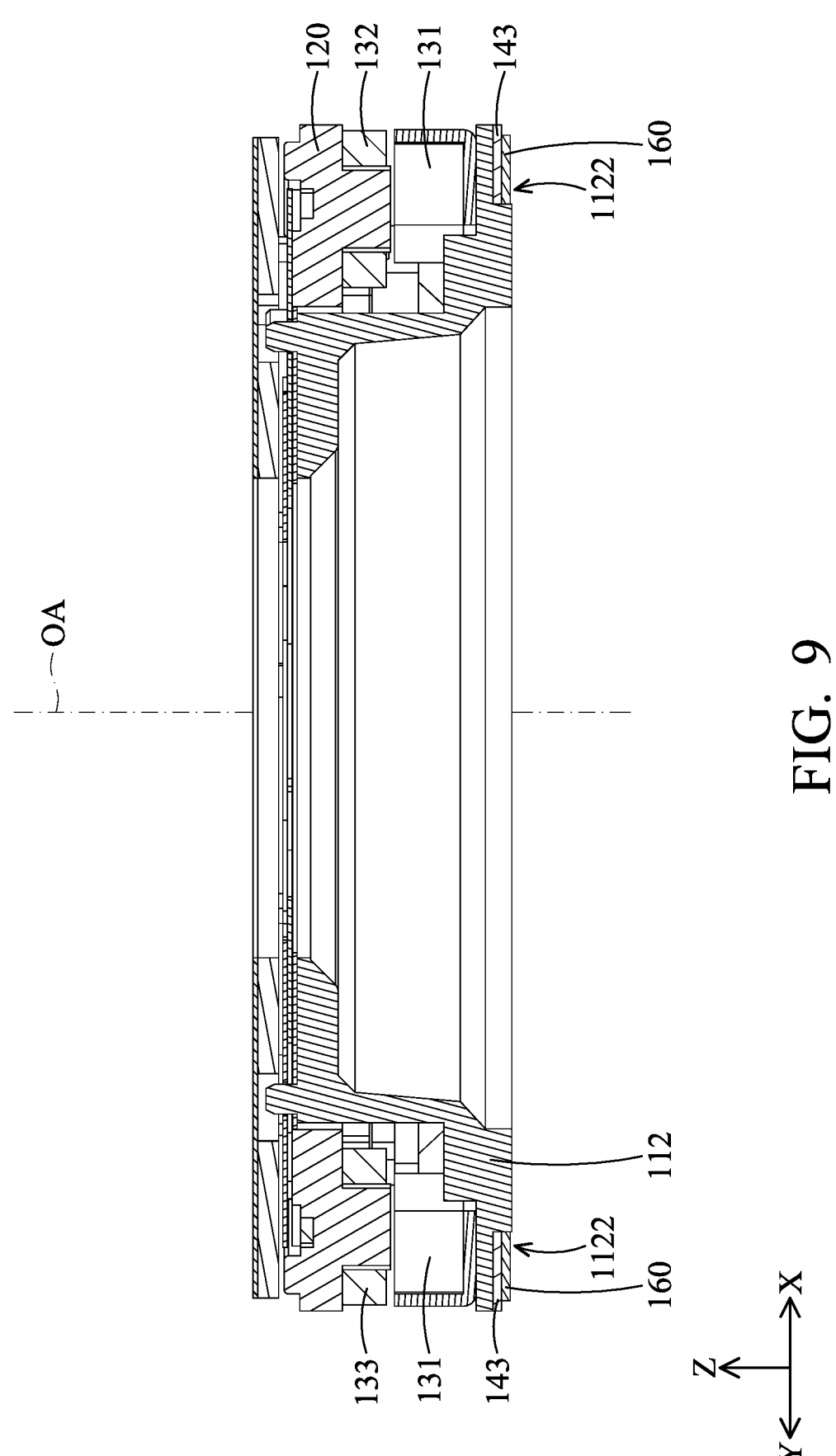
FIG. 9 is a cross-sectional view of the optical element driving mechanism and the optical element along line E-E' in FIG. 2, according to some embodiments of the present disclosure.

Please refer to FIG. 8 and FIG. 9. FIG. 8 is a cross-sectional view of the optical element driving mechanism 100 and the optical element OE along line D-D' in FIG. 2, according to some embodiments of the present disclosure; FIG. 9 is a cross-sectional view of the optical element driving mechanism 100 and the optical element OE along line E-E' in FIG. 2, according to some embodiments of the present disclosure.

As shown in FIG. 8 and FIG. 9, the base 112 may further include a base second accommodating portion 1122. According to some embodiments of the present disclosure, the base second accommodating portion 1122 may be a recess concave toward the movable part 120. Therefore, the base second accommodating portion 1122 may accommodate the third circuit element 143 and the protective element 160.

According to some embodiments of the present disclosure, the protective element 160 may be disposed under the third circuit element 143, and the third circuit element 143 may be disposed between the base 112 and the protective element 160.

According to some embodiments of the present disclosure, the protective element 160 may have a metal material, and the protective element 160 may have a non-magnetic material. For example, the protective element 160 may include stainless steel, titanium, copper, or other suitable metals. According to some embodiments of the present disclosure, the magnetic conductivity of the protective element 160 may be lower than that of iron.

According to some embodiments of the present disclosure, the base 112 may extend downward beyond the protective element 160 in the direction of the optical axis OA. In other words, the depth of the base second accommodating portion 1122 may be greater than the sum of the thickness of the third circuit element 143 and the thickness of the protective element 160.

In this way, the third circuit element 143 may be protected more effectively, so that the structure of the optical element driving mechanism 100 may be more stable.

The electronic element 151 may be disposed on the third circuit element 143, and the electronic element 151 may generate a current.

The electrical current that is generated by the electronic element 151 may flow from the electronic element 151 to the third circuit element 143, the first circuit element first portion 1411, the first driving coil 132, the second circuit element 142, the second driving coil 133, the first circuit element second portion 1412, and the third circuit element 143 (please see the direction of the black arrows in FIG. 5). Afterwards, this current may flow back to the electronic element 151 again or flow to the outside.

In this way, a stable current may be established, and the number of elements of the optical element driving mechanism 100 may be simplified, thereby achieving the effects of miniaturization and weight reduction.

The position sensing element 152 may be disposed on the third circuit element 143, and the position sensing element 152 may sense the movement of the movable part 120 relative to the fixed part 110.

According to some embodiments of the present disclosure, the electronic element 151 and the position sensing element 152 may be integrated.

The protective element 160 may include a protective element strengthening portion 161 (please refer to FIG. 3 at the same time). The protective element strengthening portion 161 may have a protruding structure that is protruded toward the optical axis OA.

The protective element strengthening portion 161 may correspond to the electronic assembly 150 and the position sensing element 152 of the electronic assembly 150 to protect the electronic element 151 and the position sensing element 152 of the electronic assembly 150.

According to some embodiments of the present disclosure, when viewed along the thickness direction of the protective element 160 (which may be parallel to the optical axis OA or the Z axis), the area of the protective element strengthening portion 161 may be larger than the area of the electronic assembly 150 or the electronic element 151 Or the area of the position sensing element 152.

In general, the optical element driving mechanism of the disclosed embodiment may have the effects of miniaturization, weight reduction, improvement of stability, simplification of manufacture and reduction of cost, so that the user may operate the optical element driving mechanism smoothly, and may obtain more Good imaging effect.

Although embodiments of the present disclosure and their advantages have been described in detail, it should be understood that various changes, substitutions and alterations may be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, the scope of the present disclosure is defined by the scope of the appended claims. In addition, each scope of the claims is constructed as a separate embodiment, and various combinations of the claims and combinations of embodiments are within the scope of the present disclosure.

What is claimed is:

1. An optical element driving mechanism, comprising:
a movable part, connected to an optical element;
a fixed part, wherein the movable part is movable relative to the fixed part;
a driving assembly, driving the movable part to move relative to the fixed part; and
a circuit assembly, electrically connected to the driving assembly, comprising a first circuit element and a second circuit element, wherein:
the first circuit element is electrically connected to the driving assembly,
the second circuit element has a plate-like structure,
the second circuit element has a conductive material,
the first circuit element and the second circuit element at least partially overlap when viewed along a thickness direction of the second circuit element,
an insulating element is disposed between the first circuit element and the second circuit element,
the second circuit element is fixed to the movable part via the insulating element, and
the insulating element is not in contact with the first circuit element.

2. The optical element driving mechanism as claimed in claim 1, wherein the first circuit element comprises:

a first circuit element fixed part fixing end;

a first circuit element movable part fixing end, opposite to the first circuit element fixed part fixing end; and a first circuit element flexible portion, being flexible, wherein the first circuit element movable part fixing end is elastically connected to the first circuit element fixed part fixing end via the first circuit element flexible portion.

3. The optical element driving mechanism as claimed in claim 2, wherein the first circuit element has a plate-like structure, wherein the first circuit element flexible portion has a strip-shaped structure, wherein a minimum width of the first circuit element flexible portion is greater than 0.04 mm, wherein a maximum width of the first circuit element flexible portion is less than 0.5 mm, and wherein the first circuit element has a conductive material.

4. The optical element driving mechanism as claimed in claim 2, wherein the first circuit element flexible portion is compressed or extended as the movable part moves relative to the fixed part.

5. The optical element driving mechanism as claimed in claim 2, wherein when viewed along a direction that is perpendicular to an optical axis, the first circuit element fixed part fixing end and the first circuit element movable part fixing end do not overlap each other.

6. The optical element driving mechanism as claimed in claim 1, wherein;

the first circuit element and the second circuit element have different materials, the first circuit element has copper or titanium copper, the second circuit element has stainless steel, and the second circuit element is fixedly disposed on the movable part.

7. The optical element driving mechanism as claimed in claim 6, wherein the Young's modulus of the second circuit element is greater than the Young's modulus of the first circuit element.

8. The optical element driving mechanism as claimed in claim 6, wherein the circuit assembly further comprises a third circuit element, and the third circuit element is electrically connected to the driving assembly, wherein the driving assembly is electrically connected to the third circuit element via the first circuit element, and wherein the third circuit element comprises a third circuit element electrical connective portion, and the third circuit element electrical connective portion has a plate-like structure.

9. The optical element driving mechanism as claimed in claim 8, wherein the fixed part comprises a base, and the base comprises a base first accommodating portion, wherein the base first accommodating portion corresponds to the third circuit element electrical connective portion, wherein a base first accommodating portion surface of the base first accommodating portion faces toward the third circuit element electrical connective portion, and wherein an electrical connective element is disposed between the third circuit element electrical connective portion and the first circuit element fixed part fixing end.

10. The optical element driving mechanism as claimed in claim 9, wherein the first circuit element fixed part fixing end is aligned with the third circuit element electrical connective portion, and the electrical connective element is disposed at the area where the first circuit element fixed part fixing end contacts the third circuit element electrical connective portion.

11. The optical element driving mechanism as claimed in claim 9, wherein the first circuit element fixed part fixing end protrudes from the third circuit element electrical connective portion, and the electrical connective element is disposed at the area where the first circuit element fixed part fixing end contacts the third circuit element electrical connective portion.

12. The optical element driving mechanism as claimed in claim 9, wherein the third circuit element electrical connective portion has a recessed structure, and the electrical connective element is disposed in the recessed structure.

13. The optical element driving mechanism as claimed in claim 8, further comprising a protective element disposed below the third circuit element, wherein the fixed part comprises a base, and the base comprises a base second accommodating portion, wherein the base second accommodating portion accommodates the third circuit element and the protective element, wherein the third circuit element is disposed between the base and the protective element, wherein the protective element has a metal material, wherein the protective element has a non-magnetic material, and wherein in an optical axis direction, the base extends downward beyond the protective element.

14. The optical element driving mechanism as claimed in claim 13, further comprising an electronic component, and the electronic component comprises a position sensing element, wherein the position sensing element senses the movement of the movable part relative to the fixed part, wherein the position sensing element is disposed on the third circuit element, wherein the protective element comprises a protective element strengthening portion, and the protective element strengthening portion corresponds to the position sensing element, wherein the protective element strengthening portion has a protruding structure, wherein the protective element has a plate-like structure, and wherein when viewed along a thickness direction of the protective element, an area of the protective element strengthening portion is larger than an area of the position sensing element.

15. The optical element driving mechanism as claimed in claim 8, wherein the driving assembly comprise:

a first driving coil, disposed on the movable part; and a second driving coil, disposed on the movable part, wherein the first circuit element comprises:

a first circuit element first portion, connected to the first driving coil; and a first circuit element second portion, connected to the second driving coil, wherein the first driving coil is electrically connected to the second driving coil via the second circuit element.

16. The optical element driving mechanism as claimed in claim 15, further comprising an electronic component, and the electronic component comprises an electronic element, wherein the electronic element is disposed on the third circuit element, wherein the electronic element generates an electrical current, wherein the electrical current flows from the electronic element to the third circuit element, the first circuit element first portion, the first driving coil, the second circuit element, the second driving coil, the first circuit element second portion, and the third circuit element.

17. The optical element driving mechanism as claimed in claim 15, wherein the second circuit element and the first circuit element first portion do not overlap each other when viewed along an optical axis direction.

18. The optical element driving mechanism as claimed in claim 15, wherein the second circuit element is disposed between the first circuit element second portion and the movable part.

19. The optical element driving mechanism as claimed in claim 18, wherein when viewed along an optical axis, the movable part, the second circuit element, an insulating element, and the first circuit element second portion at least partially overlap.

* * * * *